(No Model.)
A. VOLKENRATH.
PAN LIFTER.
No. 559,877. Patented May 12, 1896.
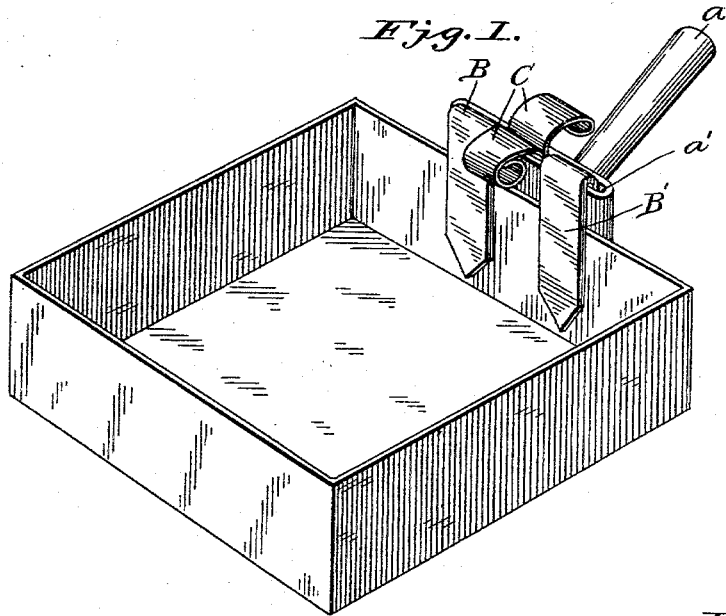
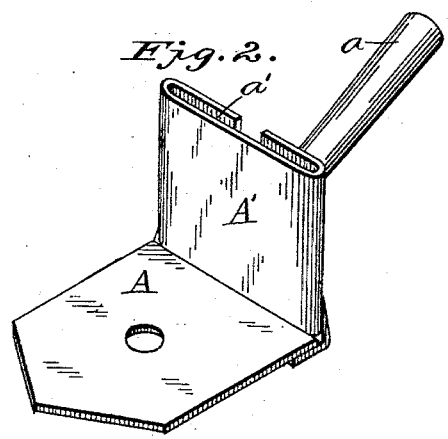
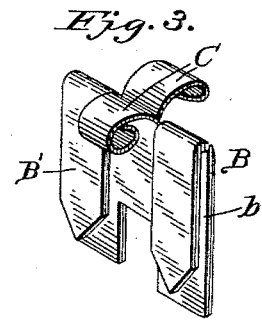
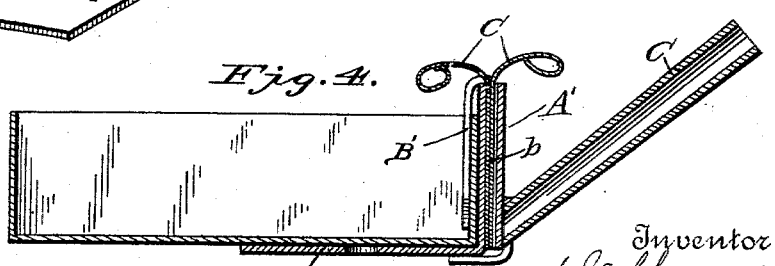
Witnesses
Edwin G. McNee,
K. A. Snow.
Inventor
August Volkenrath,
By John Wedderburn
Attorney

UNITED STATES PATENT OFFICE.

AUGUST VOLKENRATH, OF HUNTINGTON, WEST VIRGINIA.

PAN-LIFTER.

SPECIFICATION forming part of Letters Patent No. 559,877, dated May 12, 1896.

Application filed November 29, 1895. Serial No. 570,384. (No model.)

*To all whom it may concern:*

Be it known that I, AUGUST VOLKENRATH, a citizen of the United States, residing at Huntington, in the county of Cabell and State of West Virginia, have invented certain new and useful Improvements in Pan-Lifters; and I do hereby declare the following to be a full, clear, and exact description of the invention, such as will enable others skilled in the art to which it appertains to make and use the same.

This invention relates to certain new and useful improvements in pan-lifters, having for its objects, among others, to provide a simple and cheap device readily applied to any pan, either before it is placed in the oven or upon the stove or after the same is in the oven and it is desired to remove it. The device embodies a shovel-like part adapted to be slid beneath the pan and a key or other device adapted to engage said slide with the pan and connect the two, so they may be moved together.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a view showing the lifter attached to the pan. Fig. 2 is a perspective view of the lifter. Fig. 3 is a perspective view of the locking-key. Fig. 4 is a vertical longitudinal section through Fig. 1.

Like letters of reference indicate like parts throughout the several views.

Referring now to the details of the drawings by letter, A designates the plate or thin piece of material, preferably metal, provided with a handle $a$ and a vertical part A', which is double-walled, with a space $a'$ open at the top to receive the locking-key.

B is a key formed of a single piece of material, preferably sheet metal, bent upon itself to form the leg $b$, adapted to be inserted into the space between the double walls of the vertical portion of the shovel A and the portion B', substantially parallel with said legs, while at the upper end this key is provided with the handle or handles C, formed integral with said key, being preferably stamped therefrom and rolled so as to form a convenient handle.

In practice the device is applied by placing the blade of the shovel under the pan, the vertical portion of said shovel lying against the vertical portion of the pan, and then the key is inserted with its legs in the space in the vertical portion of the shovel and the other depending portion of the key engaged in the pan upon the opposite side of the vertical wall or flange thereof. This securely holds the pan to the shovel, so that it may be placed in or removed from the oven without danger of burning the hands. By removing the key the pan is disengaged from the shovel.

The cheapness and simplicity of the invention will recommend it to all persons having occasion to use such devices, and will also place it within the means of both rich and poor.

Modifications in detail may be resorted to without departing from the spirit of the invention or sacrificing any of its advantages.

What I claim as new is—

1. A pan-lifting device, comprising a shovel-like portion and a removable key for locking the same to the pan, substantially as shown and described.

2. A pan-lifting device, comprising a shovel-like portion, with a vertical part having a space open at the top, and a key having a portion designed to enter said space to lock the pan to the shovel, substantially as shown and described.

3. The combination of the shovel having a handle and a vertical portion with the space therein, of a sheet-metal key, having parallel portions designed to engage upon opposite sides of the vertical portion of the shovel to lock same to a pan, substantially as shown and described.

4. The combination of the shovel having a handle and a vertical portion with the space therein, of a sheet-metal key, having parallel portions designed to engage upon opposite sides of the vertical portion of the shovel to lock the same to a pan, said key being constructed of sheet metal having handles formed thereof, substantially as shown and described.

In testimony whereof I have signed this specification in the presence of two subscribing witnesses.

AUGUST VOLKENRATH.

Witnesses:
B. R. MYERS,
HOMER BELL.